United States Patent [19]

Wang

[11] Patent Number: 5,739,518
[45] Date of Patent: Apr. 14, 1998

[54] AUTODISCRIMINATION FOR DATAFORM DECODING AND STANDARDIZED RECORDING

[75] Inventor: Ynjiun P. Wang, Fort Myers, Fla.

[73] Assignee: Metanetics Corporation, Fort Myers, Fla.

[21] Appl. No.: 443,909

[22] Filed: May 17, 1995

[51] Int. Cl.$^6$ .................................... G06K 7/10
[52] U.S. Cl. .................. 235/454; 235/462; 382/209
[58] Field of Search .................... 235/462, 463, 235/472; 382/181, 183, 184, 209

[56] References Cited

U.S. PATENT DOCUMENTS

| | | | |
|---|---|---|---|
| 4,805,224 | 2/1989 | Koezuka et al. | 382/209 |
| 4,879,456 | 11/1989 | Cherry et al. | 235/463 |
| 4,962,423 | 10/1990 | Yamada et al. | 382/209 |
| 5,134,272 | 7/1992 | Tsuchiya et al. | 235/462 |
| 5,227,617 | 7/1993 | Christopher et al. | 235/462 |
| 5,235,167 | 8/1993 | Dvorkis et al. | 235/462 |
| 5,276,315 | 1/1994 | Surka | 235/462 |
| 5,471,041 | 11/1995 | Inoue et al. | 235/462 |
| 5,475,768 | 12/1995 | Diep et al. | 382/181 |
| 5,481,098 | 1/1996 | Davis et al. | 235/472 |
| 5,483,605 | 1/1996 | Rostamian | 382/181 |
| 5,504,319 | 4/1996 | Li et al. | 235/462 |
| 5,510,603 | 4/1996 | Hess et al. | 235/462 |
| 5,524,065 | 6/1996 | Yagasaki | 382/181 |
| 5,644,765 | 7/1997 | Shimura et al. | 382/181 |

*Primary Examiner*—Donald T. Hajec
*Assistant Examiner*—Mark Tremblay
*Attorney, Agent, or Firm*—Kenneth P. Robinson

[57] ABSTRACT

In a warehouse, for example, incoming packages may bear dataforms of a variety of different types such as 1D bar codes, 2D bar codes and matrix codes. By use of image features distinctive for different dataforms, a hand-held reader is enabled to autodiscriminate among different 1D and 2D bar codes and matrix codes. If the sampled image data permits identification of a specific type of dataform, a decoder employing a suitable decoding protocol is used to decode the dataform. Iterative use of additional image features and sampling patterns increases the accuracy of dataform identification. Data decoded from each incoming dataform is recoded and autotranslated into a preselected standardized dataform label placed on each respective package. Subsequent reading of package dataforms thereby requires reading and decoding of only the single standardized dataform format. Systems and methods are described.

30 Claims, 12 Drawing Sheets

T,T,T,X,X,T,T,T
MaxiCode bull's eye

T,T,T,T,
Code 1 Center Guard Pattern ns, wh
AUTODISCRIMINATION FOR DATAFORM DECODING AND STANDARDIZED RECORDING This invention relates to systems and methods for reading dataforms, such as bar codes and matrix codes, and more particularly to autodiscrimination to identify an unknown dataform to enable selection of an appropriate decoding protocol. Also, autotranslation simplifies subsequent reading and decoding by enabling dataforms of a variety of types to be read and decoded and the information content recoded into a standardized dataform format.

BACKGROUND OF THE INVENTION

Current one-dimensional (1D) bar code readers can read several formats of 1D bar codes. In a 1D reader that is programmed to read more than one bar code format, such as UPC and Codabar, the reader typically incorporates a separate decoder for each format. For a bar code of unknown type the reader does not first distinguish between the two formats. The reader merely attempts to decode the binary stream of data representing the black/white bar and space data with each decoder. One decoder which happens to correspond to the bar code format will decode while the remaining decoders will not be able to decode. This system provides an acceptable response time for 1D bar codes because the limited amount of encoded data permits a 1D decoder to operate so quickly that the reader can attempt to decode with several decoders one after another without a noticeable time delay. Current 2D dataform readers can only read one type of a 2D dataform. For example, Symbol Technologies PDF1000 can read PDF417 bar codes only. Tokyo Electric Corporation's 2D reader can read data matrix codes only. It is not practical to provide a 2D reader programmed to read more than one code, by merely programming the reader to attempt to decode with a series of decoders one after another until a successful decode is found. Operationally this is not practical because each 2D decoder requires a significant amount of time to decode a 2D dataform. Therefore, the total response time would be unacceptable.

There exist today many 1D and 2D dataform formats with very limited standardization. In operation of a warehouse, for example, incoming cartons may each bear one of a variety of different types of dataforms, without prior identification of which type will appear on any particular incoming carton. It may, therefore, be desirable to relabel cartons at the receiving dock using a preselected standard dataform format, so that for subsequent purposes internal dataform readers require only one decoder to decode all dataforms of the standard format. Such standard dataform format relabeling would require identification and decoding of each incoming dataform and encoding of decoded information into the selected standard dataform format. With reference to any such relabeling, it should be noted that after a dataform is decoded and formerly encoded data provided for further processing, the reader also typically provides information identifying the type of dataform which was decoded. This information is provided because the format or type of dataform is often indicative of the meaning or nature of the encoded data. For example, the UPC format indicates the encoded numerical data is a product identification.

BACKGROUND OF DATAFORMS

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes, matrix codes and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

A bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark on light relationship in one orientation and a light on dark relationship in a different orientation. In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

OBJECTS OF THE INVENTION

In view of the foregoing, objects of the present invention are to provide methods and systems characterized by a capability for one or more of the following:

decoding of dataforms of several different formats;

identification of dataform format prior to decoding;

recoding in a standard dataform format of data decoded from different types of dataforms;

dataform identification by use of image features representative of specific dataforms;

use of predetermined sampling patterns to select image data for patterns of pixel positions;

dataform format recognition by analysis of sampling pattern image data relative to dataform image features;

printout in a standard dataform format of data decoded from several types of dataforms.

SUMMARY OF THE INVENTION

In accordance with the invention, a method employing dataform identification before decoding of a dataform present in a target area, includes the steps of:

(a) making available feature reference data defining at least a first image feature of at least a first type of dataform;

(b) making available pattern reference data defining at least a first sampling pattern for selecting a limited amount of image data for a predetermined pattern of pixel positions;

(c) providing image data, for a two-dimensional array of pixel positions, representative of illumination reflected from the target area;

(d) using step (b) pattern reference data for such first sampling pattern to select image data from pixel positions corresponding to the first sampling pattern from image data provided in step (c);

(e) utilizing step (a) feature reference data for the first image feature to develop an identification indicia representative of a level of compatibility between said image data selected in step (d) and such image feature;

(f) activating, in response to the identification indicia, a decoding protocol suitable for processing step (c) image data to decode the first type of dataform, in order to attempt to decode the dataform present in such target area;

(g) after successful decoding, recoding into a preselected dataform format information made available from the step (f) decoding including information identifying the dataform present in the target area as to type of dataform; and (h) outputting a dataform in such preselected format.

Also, in accordance with the invention, a system employing dataform identification before decoding of a dataform present in a target area includes a memory device to store (a) feature reference data for at least a first image feature representative of at least one type of dataform and (b) pattern reference data for at least a first sampling pattern for selecting a limited amount of image data for a predetermined pattern of pixel positions. A sensor array provides image data for a two-dimensional array of pixel positions. The image data is representative of illumination reflected from the target area including the dataform of an unidentified type.

The system includes a processor coupled to the memory device to use pattern reference data for such first sampling pattern in order to select (from image data provided by the sensor array) image data for pixel positions corresponding to the first sampling pattern. A recognition unit is coupled to the processor to utilize feature reference data for the first image feature to develop an identification indicia representative of a level of compatibility between the selected image data and the first image feature. The identification indicia is thus useful in identifying the type of dataform present in the target area. A decoding unit having the capability to implement a plurality of dataform decoding protocols, and responsive to the identification indicia for selection of one of the protocols, is provided for attempted decoding of the dataform present in the target area. An encoding unit coupled to the decoding unit is responsive to information decoded from the dataform to recode the following into a preselected type of dataform: (a) information decoded from the dataform and (b) information identifying the dataform present in the target area as to type of dataform.

For a better understanding of the invention, together with other and further objects, reference is made to the accompanying drawings and the scope of the invention will be pointed out in the accompanying claims.

DESCRIPTION OF THE INVENTION

Figure 1A:
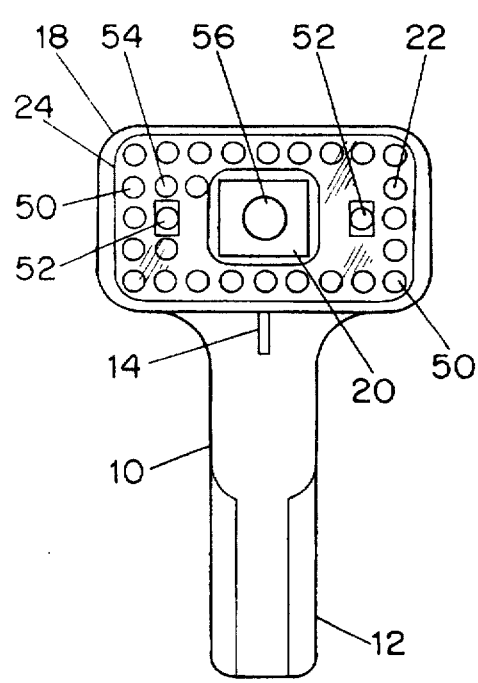
FIGS. 1A, 1B and 1C are respectively front, side and top views of an automatic exposure imaging system in the form of a hand-held dataform reader utilizing the invention.

An embodiment of a dataform reader utilizing the invention is illustrated in FIGS. 1A, B and C. The complete dataform reader will be described before focusing more particularly on autodiscrimination and autotranslation systems and methods in accordance with the invention.

Figure 1B:
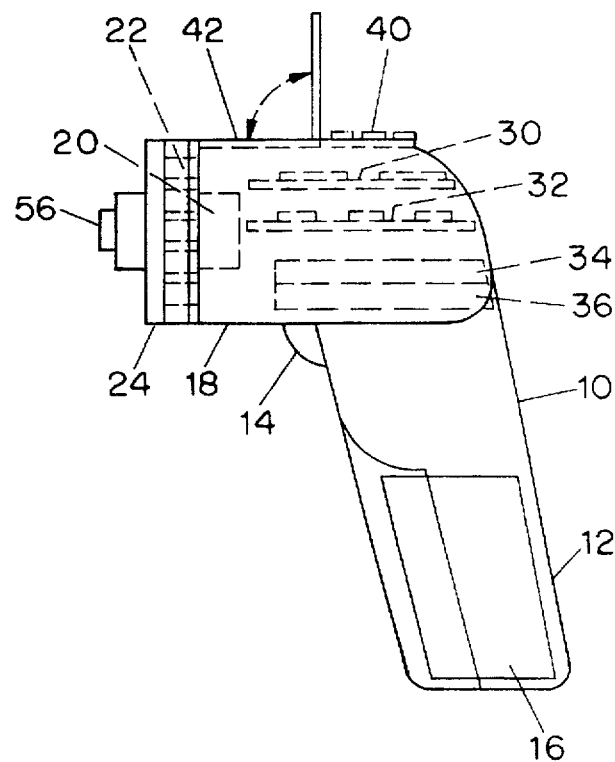
Figure 1C:
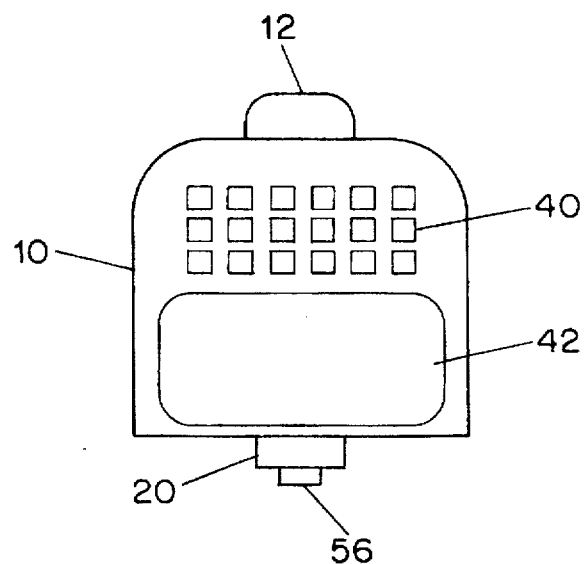

FIG. 1A is a front conceptual view of the dataform reader 10 and FIGS. 1B and 1C are corresponding side and top views, respectively. A portion of the upper casing is removed in FIG. 1B to provide a simplified view of internal components. As shown, the reader includes a suitable impact-resistant plastic case with a hand grip portion 12, a trigger device 14 and battery compartment 16. The dataform reader also includes an upper enclosure portion 18 which, as illustrated in simplified form in FIG. 1B, may include a sensor array assembly 20, illuminator array 22 and illuminator lens 24, each of which will be described in greater detail. FIG. 1B also depicts a processor and memory unit 30 and an input/output (I/O) unit 32, which may take the form of pluggable circuit boards inserted into slots from the rear of the reader 10. Additional slots at 34 and 36 may be utilized to provide additional or extended operating capabilities by enabling insertion of PCMCIA type cards, etc. As further depicted in FIGS. 1B and 1C, the dataform reader 10 may include a data entry keyboard 40 and a display 42, represented as adjustable to different viewing angles. These and other features may be provided by skilled persons using known techniques and types of components, except that features and elements particularly relevant to implementation of the invention are provided as will be further described.

In the illustrated embodiment, there is provided an automatic exposure dataform reader 10 configured to read a dataform (such as a 1D or 2D bar code) existing in a target area positioned at a distance from the dataform reader. Thus, for example a bar code can be printed on a label affixed to a package, component or letter and the dataform reader held by an operator, with the front of the reader at a distance from the bar code.

As shown in FIG. 1A, the reader 10 includes an array of illuminators with three different functions. Perimeter illuminators, such as shown at 50, are positioned in a frame type configuration and arranged to illuminate the target area with a border or frame effect which indicates the field of view of the sensor array assembly 20. Focusing illuminators, shown at 52, are arranged in this embodiment to provide angled beams of light which intersect or overlap at a predetermined distance in front of the reader. That distance represents a fixed focus distance, as will be further described. Exposure illuminators, such as shown at 54 and which typically may be included in greater numbers, are arranged to provide a relatively uniform level of target area illumination when turned on during an exposure period for the purpose of reading the dataform (e.g., capturing an image of the dataform in the sensor array). Each of the illuminators may be an appropriate form of device, such as a low cost light emitting diode (LED), arranged to provide the respective levels of illumination determined to be appropriate in applications of the invention. The number, types, arrangement and utilization of the illuminators can be determined as appropriate. Depending upon the application, the perimeter illuminators 50 or focusing illuminators 52 may be used alone or in combination to provide exposure illumination during exposure periods. The illuminator lens 24 may comprise an array configuration including a small lens portion in front of each of the illuminators 50, 52 and 54 in order to provide appropriately focused beam configurations for each of the respective functions already discussed. In the FIG. 1A view a central lens 56 is arranged to focus upon the face of the sensor array contained in assembly 20 illumination reflected from the target area and any included dataform, in order to enable the array to sense the image and provide image signals.

Figure 2:
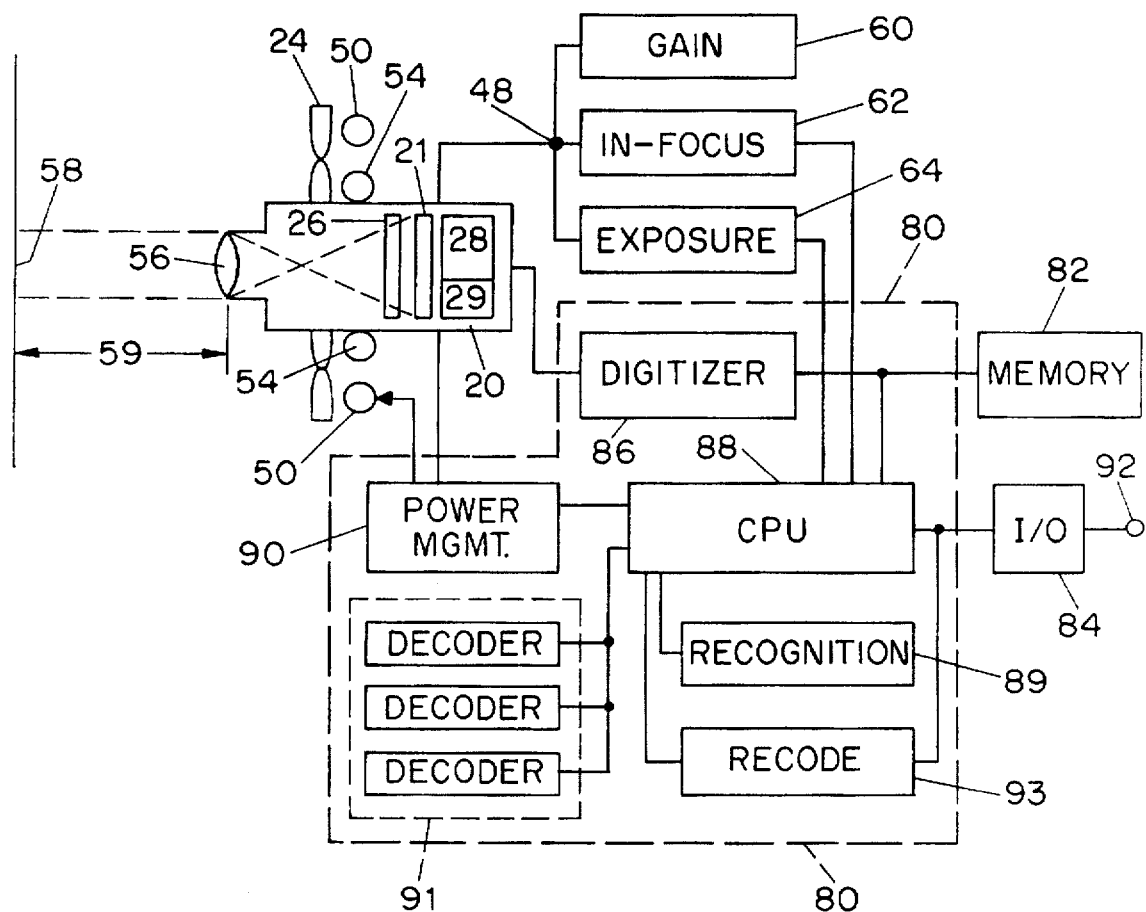
FIG. 2 is a block diagram of portions of the dataform reader with a conceptual side view of optical components of the reader.

Referring now to FIG. 2, there is shown a simplified block diagram of portions of the dataform reader utilizing the invention. A conceptual cross-sectional view of related optical elements is included. As shown, sensor array assembly 20 projects through lens assembly 24 and the array of illuminators 50 and 54 and includes a sensor array 21, optical filter 26 and array control unit 28, with associated clock device 29. Sensor array 21 is positioned behind (to the right of, in this side view) central lens 56 and filter 26. By providing a filter 26 which is transmissive to illumination provided by the illuminators, but effective to reduce transmission in other portions of the ambient light spectrum, the effects produced by ambient light during the exposure period are reduced.

As noted, sensor array assembly 20 may include a two-dimensional array 21 of sensing cells (each utilizing a photodiode and responsive to incident reflected light). Array control unit 28 may typically include vertical and horizontal readout circuits, devices for sensing charge or voltage appearing at individual sensing cells, and an output amplifier device with adjustable gain for coupling image signals from the sensor array assembly 20, as well as clock device 29 for providing timing control of the reading of image signals from selected sensor elements. An arrangement of this type, suitable for use in the dataform reader 10, is shown and described in U.S. patent application Ser. No. 08/258,428 filed Jun. 10, 1994, and having a common assignee herewith. The content of such copending application is hereby incorporated by reference. While other types of sensor array arrangements may be utilized in implementation of the invention, an advantage in use of the type of arrangement of the referenced patent application is that the entire sensor array, plus some or all of the associated gain control, focus sensing and exposure control circuitry, may be enabled to be implemented on a single chip using known application of CMOS technology (or PMOS, NMOS, Bipolar, BiMOS, BiCMOS, or other existing or newly available technology). Use of existing CMOS technology, for example, is effective to provide significant advantages of established production techniques, single chip size, weight and cost advantages and, possibly most importantly, low power consumption (as compared to higher power requirements of prior CCD or other arrangements whereby support circuitry for the sensor array is located off chip).

In FIG. 2, the sensor array is focused, via lens 56, on target area 58 which is at a distance 59 from lens 56. The filter, 26 is placed between the lens 56 and the sensor array. Filter 26 can be specified so that it is primarily transmissive only to light in a particular portion or band of the electromagnetic spectrum and is effective to reduce transmission in other portions of the ambient light spectrum (e.g., portions differing from the transmissive band or portion). With this approach, the sensor array can be arranged to be relatively non-responsive to ambient light reflected from the target area.

Figure 3:
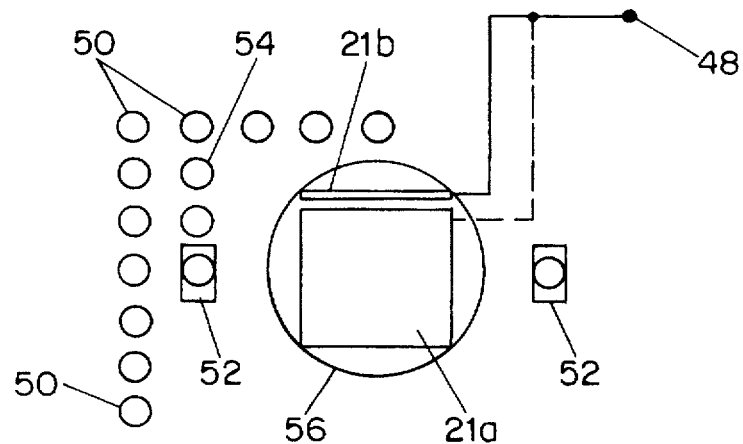
FIG. 3 illustrates details of implementations of a portion of the FIG. 2 system.

FIG. 2 also includes an in-focus sensing device 62 responsive to image signals provided from a plurality of sensor elements and arranged to provide an "in-focus" signal usable to initiate a dataform reading session. The in-focus signal is provided when an area of illumination provided by the focus illuminator or illuminators is characterized by having at least one of (a) a size within a predetermined size range, (b) a brightness within a predetermined brightness range, and (c) a location within a predetermined location range, as represented by such image signals. FIG. 3 indicates two arrangements for providing appropriate image signals to device 62. In FIG. 3, 56 represents an outline of the array focusing lens and 21a represents the outline of an array of sensing elements included in sensor array assembly 20. At 21b is indicated a linear sensor which may comprise one or two rows of sensor elements provided separately from the element array 21a. Linear array 21b is connected to point 48 of FIG. 2 under the control of array control unit 28 (not shown in the simplified representation of FIG. 3).

Figure 4:
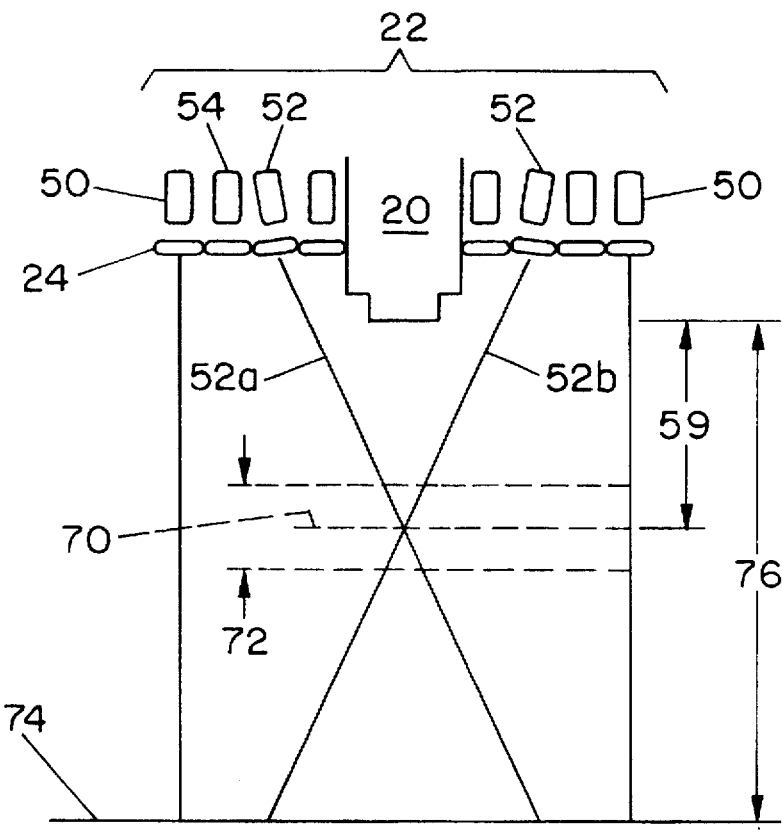
FIG. 4 is a conceptual side view illustrating aspects of an automatic focus sensing system used in the FIG. 2 dataform reader.

FIG. 4 is a representation of focus illuminators 52 providing, via lens assembly 24, angled light beams 52a and 52b as previously discussed. As shown, these beams intersect or cross at a distance 59 from the front of the lens 56. At distance 59, there is represented a side view of the plane of focus 70 of the sensor array of array assembly 20 in combination with focusing lens 56 (see also FIG. 2).

Thus, with particular choices of a sensor array configuration and lens, the dataform reader will exhibit an in-focus condition, with an image of the target area and any included dataform accurately focused on the sensor elements of array 21, if the target area lies in the plane 70 which is at a distance 59. Further, the lens 56 can be specified so as to provide a reasonable depth of focus, with the result that an image of the target area will be acceptably focused on the sensor elements for any separation distance within the depth of focus range indicated at 72. Once the distance 59 has been determined for a particular reader design, the beam angles of illuminators 52 can be adjusted to provide beam intersection or overlap at the distance 59, as shown in FIG. 4. With this arrangement, linear sensor 21b of FIG. 3 will initially provide image signals representative of target area illumination by two spots of light located at spaced positions when the target area lies in plane 74 at a distance 76. Then, as the dataform reader is moved closer to the target area so that the target area lies in plane 70 at distance 59, the two spots of light will converge into a single brighter spot at a central location.

The image signals from linear array 21b will thus provide information representative of the single brighter spot of illumination and its location, thereby providing information indicative of the in-focus condition. By providing a degree of tolerance on the in-focus image signal indication, the in-focus indication can be adjusted to accommodate the depth of focus range 72. Upon successful distance adjustment (e.g., user movement of a hand-held reader closer or farther from the dataform image) to achieve an in-focus indication, in-focus sensing device 62 is arranged to provide an "in-focus" signal usable for initiating a reading and decoding cycle.

It will be apparent that the arrangement as described also enables operation in a manual in-focus determination mode. Thus, with the operator adjusting the position of the dataform reader relative to the target area and observing the convergence of the two spots of light into a single spot, as described, an in-focus indication can be provided by operator activation of an appropriate key of keyboard 40 or trigger switch when convergence is achieved.

With reference to FIG. 3, the dotted connection between sensing element array 21a of assembly 20 and circuit point 48 indicates an alternative configuration. As shown in FIG. 2, point 48 provides connection to in-focus unit 62 (as well as units 60 and 64). Instead of providing additional sensing elements necessary in order to provide a dedicated linear sensor 21b, it can be arranged to make temporary use of one or more lines of elements of array 21a for focusing purposes, independently of the basic image sensing function of array 21a. With the latter arrangement, the desired in-focus determination can thus be made without the requirement to provide any separate linear sensor such as 21b.

As shown, FIG. 2 further includes an exposure control device 64 responsive to image signals from one or more selected sensor elements and arranged to provide "start" and "stop" signals usable for beginning and terminating an exposure period. Exposure control 64 utilizes the image signals to provide the stop signal in response to reflection of a predetermined level or intensity of illumination. Typically, such predetermined level or intensity will be measured within a period initiated by the start signal provided by the exposure control device and may represent an accumulated representation of the intensity of reflected light over time. By converting image signals received in the period to a voltage representative of accumulated image signal levels, and comparing that voltage to a preset threshold voltage, the stop signal can be generated when the accumulated voltage reaches the threshold voltage, representing a predetermined illumination exposure of the target area.

Figure 5:
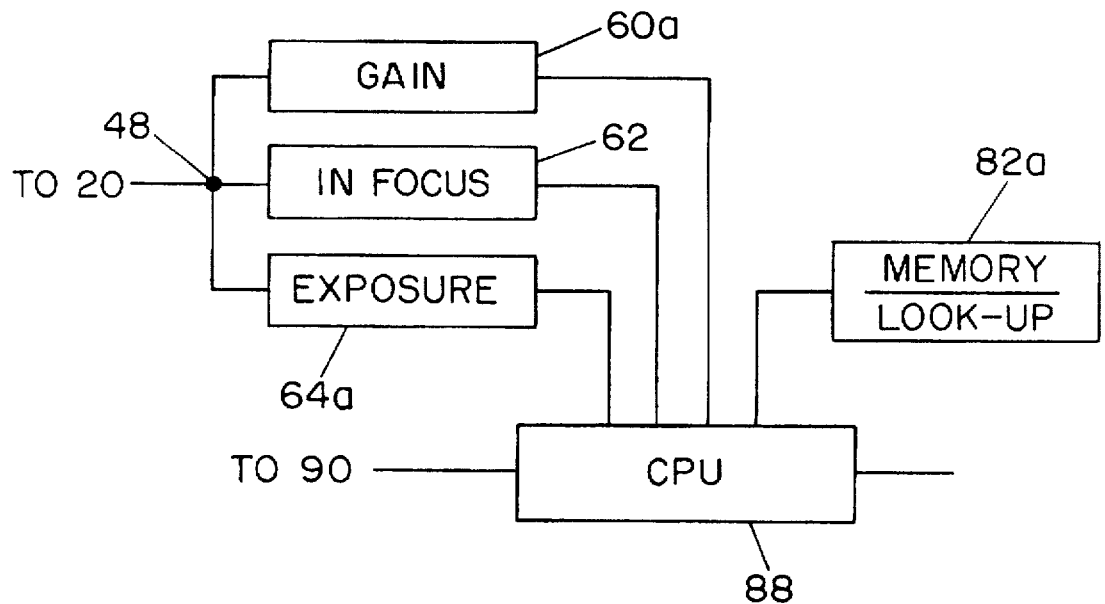
FIG. 5 is a block diagram showing a second embodiment of a portion of the FIG. 2 dataform reader.

In another embodiment illustrated in FIG. 5, the exposure control device sets the duration of the time between the start and stop signals by responding to the illumination intensity as measured by a preset fixed time period sample exposure of one or more selected sensor elements. The image signals from such sensor elements (typically, two rows of sensor elements, as discussed above) will thus be representative of the level of illumination reflected from the target area during the preset sample exposure period. By converting the image signals to a gray level signal, an exposure control signal representative of the appropriate duration of the adjustable exposure period is provided. In order to determine the actual duration of the exposure period represented by the control signal, the exposure control device 64a is coupled to the CPU 88. As shown in FIG. 5, the CPU is arranged to access a look-up table (stored in memory unit 82a) containing exposure period data correlated to gray level signal values. The actual look-up table data can be derived in advance on an empirical or other appropriate basis utilizing the level of reflected light during the preset initial period of predetermined duration as an indication of the exposure time which will be required to enable the capture of usable image data on a single frame activation basis.

As also indicated in FIG. 2, gain control device 60 is arranged to respond to image signals provided from one or more of the sensor elements of array assembly 20, and more particularly to the level of reflected light represented by such image signals, to control image signal amplification. The gain control in this embodiment is achieved by a gain control signal coupled back to the above-referenced adjustable gain output amplifier included in the sensor control unit 28. This enables the amplitude of the image signals provided by the sensor array to be maintained within a predetermined range substantially independently of reflected ambient illumination as represented by amplitude levels of selected image signals.

As illustrated in FIG. 2, this embodiment of the dataform reader in accordance with the invention also comprises a processing unit 80, memory unit 82 and input/output (I/O) module 84. Processing unit 80, which may include a digitizer 86, CPU 88, and power management module 90, receives image signals from sensor array assembly 20 and provides image data in digitized form for storage in memory unit 82. Unit 80 is responsive to the start and stop signals from units 62 and 64 to control the exposure period. As will be further described, during the operating sequence processing unit 80 is also arranged, via power management module 90 coupled to a battery (not shown), to turn on and off the perimeter and focus illuminators 50 and 52, and exposure illuminators 54 and couple power for operation of the sensor array assembly 20. Processing unit 80 further embodies a dataform identification module 89, a plurality of decoders 91 and an encoder 93 used for recoding purposes. Decoders 91 are each configured to decode a different dataform format and arranged to implement decoding of a dataform using image data stored in memory unit 82. Operation of these units will be described further.

Upon successful decoding of the dataform, unit 80 also provides an end-cycle signal effective to terminate decoding operation and also to end the reading of sensor elements to provide image signals, by terminating at least one of the coupling of input power and provision of clock signals which are both required in the reading of sensor elements under the control of array control unit 28.

Figure 10:
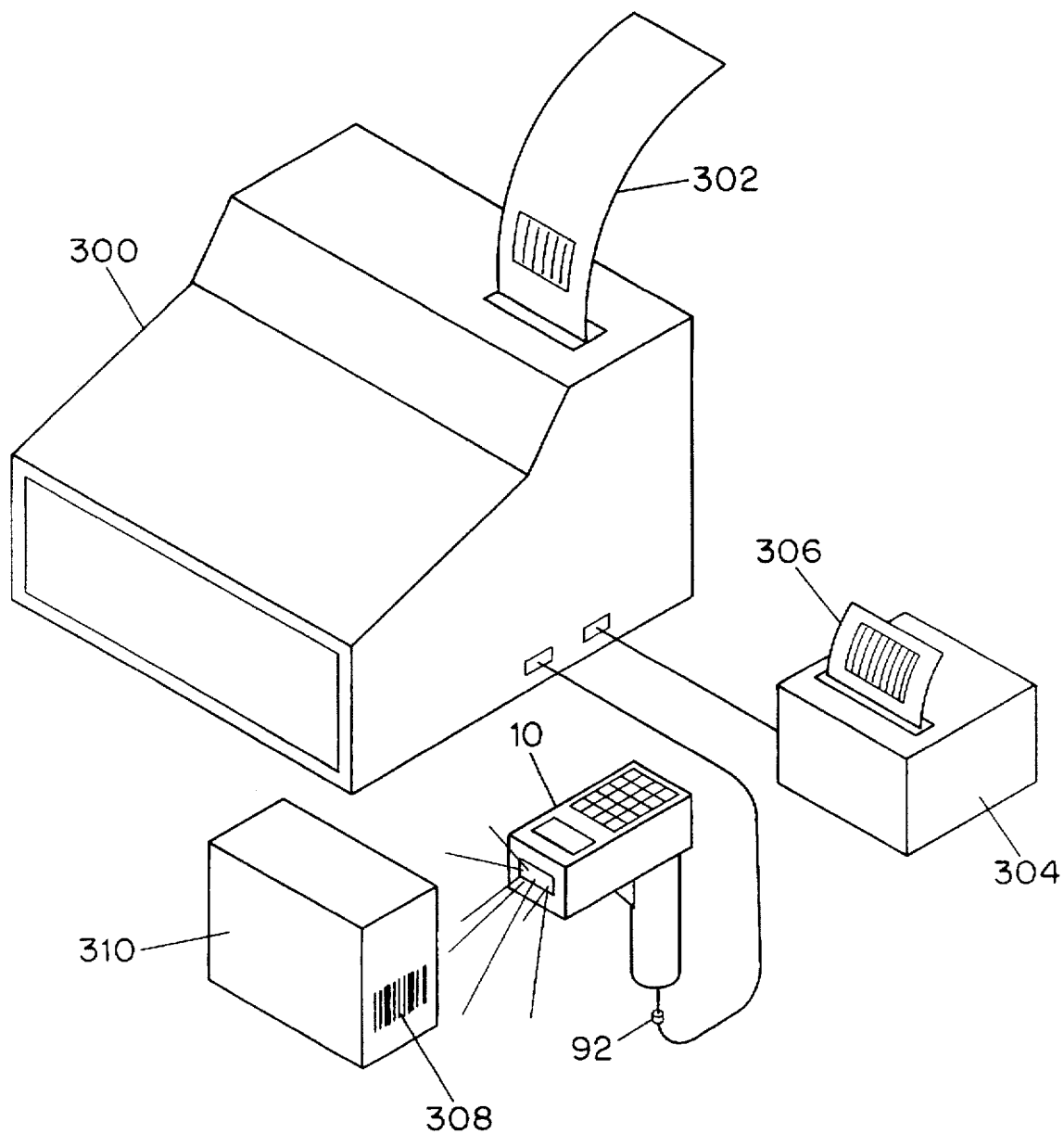
FIG. 10 illustrates a form of autodiscrimination, autotranslation system using the invention.

Separately, decoded dataform information, which includes decoded data and data descriptive of the dataform format in which the data was encoded, are provided to an output device 92, via I/O module 84. The I/O module 84 may be arranged to operate with PCMCIA cards in interface slots 34 and 36 discussed with reference to FIG. 1B, and may be arranged to provide radio, infrared, wired or other signal transmission and reception capabilities. Output device 92 may accordingly be an output port for coupling output signals via a conductor, an antenna or optical device for radio or infrared transmission, or other suitable device, with I/O unit 84 arranged to provide the decoded dataform information in suitable form for use with the particular form of output device. Modem, speech recognition, handwriting recognition, memory and other types of additional capability or peripheral cards may also be inserted in the PCMCIA slots for operation in cooperation with processing unit 80 and I/O module 84 to provide extended and further features. Output device 92 may couple to a dataform encoder and printer as shown in FIG. 10. The dataform information, including decoded data and information descriptive of the type of dataform in which the data was originally encoded, can both be recoded and printed in a preselected or standardized dataform format. This operation will be described in more detail.

With an understanding of the dataform reader as described, it will be apparent that for dataform reading and in other applications an imaging system provided in accordance with the invention may include automatic gain control, automatic exposure, automatic focus sensing, single frame image capture and other features as described.

GENERAL OPERATION

Figure 6:
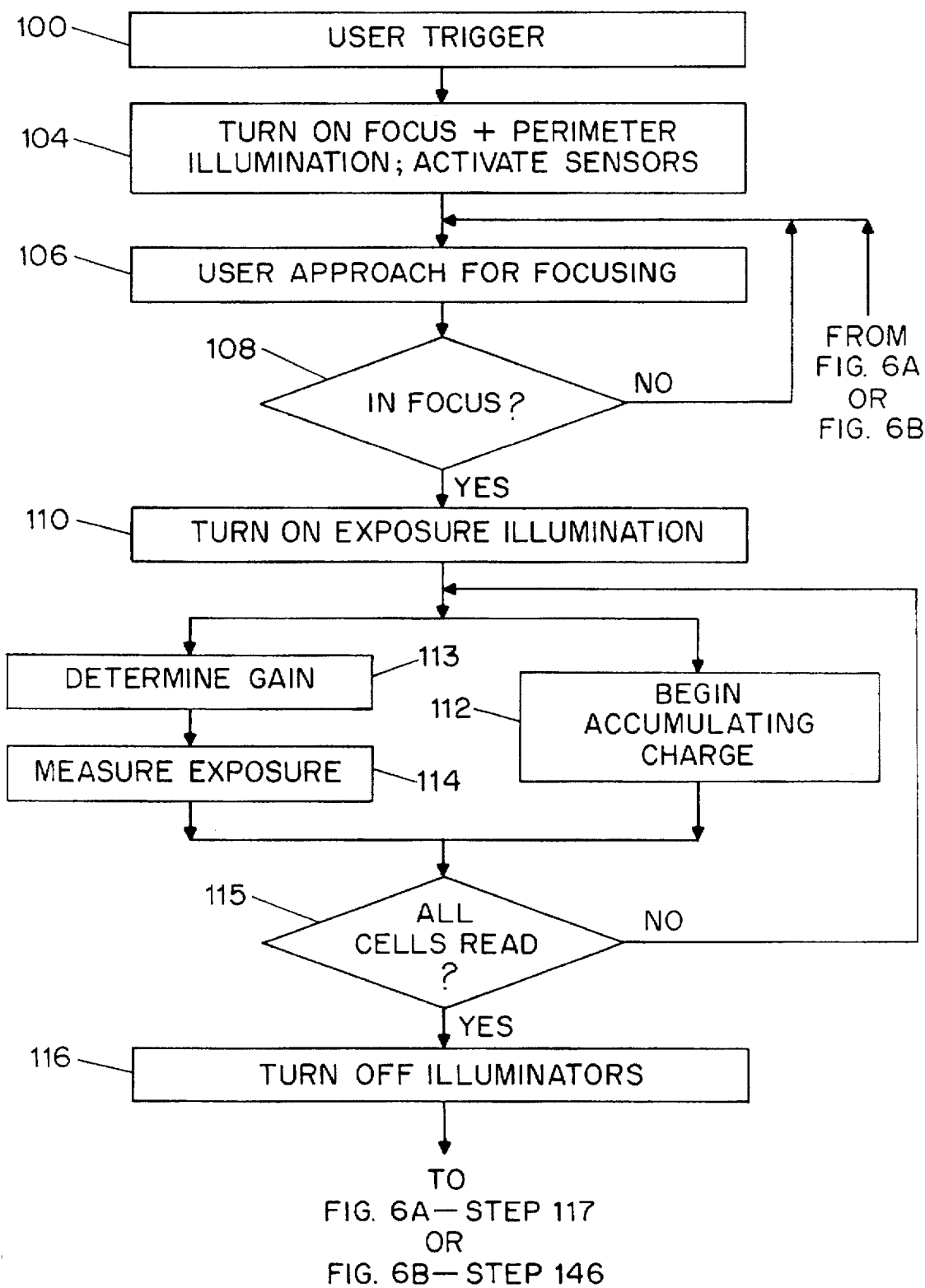
FIG. 6 is an operational flowchart useful in describing general operation of the illustrated dataform reader.

With reference now to FIG. 6 there is shown an operational flowchart with reference to operation of an imaging system utilizing the invention. At step 100, a user activates trigger device 14 of dataform reader 10 shown in FIG. 1B. At step 104, perimeter illuminators 50 and focus illuminators 52 are turned on and reading of sensor elements is initiated. At step 106, the user adjusts the distance between the dataform reader 10 and the target area to achieve a separation distance within range 72 in FIG. 4, at which point the areas of illumination intersect and merge into a single smaller, brighter area or spot of illumination having a central location. At step 108, the focus condition achieved in step 106 is monitored on the basis of image signals from a linear array of sensors indicative of whether the area of illumination is characterized by at least one of (a) a size within a predetermined size range, (b) a brightness within a predetermined brightness range, and (c) a location within a predetermined location range, or any combination of the three, as will occur as the two illumination areas, as provided on the target area by beams 52a and 52b in FIG. 4, overlap and merge. For two round spots of illumination, the spots will thus become concentric when focused and this minimum size condition can be detected in a variety of ways, including detecting the relative positions of the two spots within the field of view. When such illumination area merge is achieved as characterized, an "in-focus" signal is effective at step 110 to turn on all illuminators of the exposure array (e.g., illuminators 50 or illuminators 50 and 52, depending upon the particular configuration). As discussed, such in-focus signal can be implemented automatically or manually based on operator observation.

Upon turning on the exposure illuminators, the exposure control device sends a start signal to sensor array assembly 20 which is effective to reset any accumulated charge on the sensors to a reference charge. The photo sensors immediately begin accumulating a new charge as indicated at step 112. Simultaneously the exposure control device and the gain control device periodically measure accumulated charge on a sample of photodetectors at steps 113 and 114. The gain control device at step 113 uses sample image data to select an appropriate amplitude gain and offset signal to apply to the sensor array amplifier in array control unit 28. At step 114, the exposure control device monitors the sample image data and when the sample image data indicates that the level of reflected light from the target area, on a cumulative basis, has reached a predetermined level, the exposure control device generates a stop signal. In response to the stop signal the accumulated charge on the exposed sensor is measured and converted to a voltage signal. Known types of sensor arrays utilizing two-dimensional arrays of photosensitive cells are structured so that sensor elements are grounded to a reference charge level and then permitted to accumulate charge during an exposure period. Then, pursuant to a reading process, either all or selected cells (e.g., one half of the cells, in an interlaced configuration, or one line in a row-by-row readout arrangement) are sampled simultaneously to measure accumulated charge, with data temporarily stored and read out row-by-row sequentially using a shift register arrangement. A more detailed explanation of readout is provided in application Ser. No. 08/332, 592, filed Oct. 31, 1994 and having a common assignee herewith. The contents thereof are hereby incorporated by reference. At step 115, if no more cells require readout (e.g., all cells have been sampled simultaneously) the exposure illuminators are turned off. However, if the configuration is such that additional cells remain to be read, in this embodiment the system will return to steps 112 and 113. The exposure control device will then generate a start signal to initiate an exposure period for the next group of cells, which will be read out at the end of that exposure period. After reading a complete frame, the system will advance from step 115 to step 116 at which point the exposure illuminators are turned off.

AUTODISCRIMINATION AND AUTOTRANSLATION

If the type of dataform were known, decoding could be implemented immediately following step 116 in FIG. 6. Where the dataform on an incoming package, for example, may have any one of a number of formats, the present invention provides a dataform identification capability implemented before activating actual decoding of the dataform.

With reference to FIG. 2, there is illustrated a system employing dataform identification before decoding of a dataform present in a target area. A typical target area in this context may be a portion of the surface of a package or other item bearing a dataform at which the hand-held dataform reader of FIG. 1 is aimed by a user. The FIG. 2 autodiscrimination system includes memory device 82 arranged to store both feature reference data and pattern reference data. Particular types of dataforms exhibit particular image features which may be representative of only a single type of dataform or which may be common to a number of types of dataforms. Memory 82 can be arranged to store feature reference data for one or a plurality of image features representative of one or more types of dataforms, as will be discussed with reference to FIG. 7. With knowledge of such dataform image features, sampling patterns can be defined for use in selecting image data for a predetermined pattern of pixel positions of an image, which pattern would be likely to exhibit an indication of the presence of a particular image feature. Thus, a particular dataform format may include image features in the form of recognizable start and stop patterns positioned at each vertical edge of the dataform. A sampling pattern effective to select image data for a horizontal line of pixel positions would be likely to cross the start and stop patterns, so as to include information indicating their presence. Particular sampling patterns will be discussed with reference to FIGS. 8A, 8B and 8C. As will be appreciated, the use of such sampling patterns typically requires readout of only a limited amount of image data and may therefore be carried out much more quickly and efficiently than reading out all of the image data, as would be required for attempted decoding of the dataform. Pattern reference data for at least a first sampling pattern for selecting a limited amount of image data for a pattern of pixel positions is thus stored in memory 82. In practice, pattern reference data for a number of such sampling patterns may be stored.

As already described, the FIG. 2 system includes a sensor array 21 configured to provide image data for a two-dimensional array of pixel positions. In use with a dataform in a target area, the image data will be representative of illumination reflected from the target area and dark and light dataform elements. A processor, shown as CPU 88, is coupled to the memory 82 to use pattern reference data. For example, pattern reference data for a first sampling pattern may be used to select (from image data provided by the sensor array 21) image data for pixel positions corresponding to the first sampling pattern.

A recognition unit 89 is arranged to utilize feature reference data for the first image feature to develop an identification indicia representative of a level of compatibility between the selected image data and a first image feature. Thus, as discussed, the image feature is representative of a type of dataform. By comparative analysis the image data selected by use of the sampling pattern is compared to the predetermined image feature. For an absence of compatibility between the selected image data and the image feature an indicia represented by a signal having a first amplitude level may be provided. For a positive identification of a specific type of dataform a higher level indicia signal can be provided. For a comparison indicating the presence of a dataform identified only as having any of two or three possible formats an intermediate level indicia can be provided. The resulting indicia is therefore useful in identifying the type of dataform present in the target area, but may fall short of actually identifying a specific type of dataform. With an understanding of the foregoing, it will be appreciated that the probability of actual identification can be increased by repeating the comparison using (a) a second or plurality of sampling patterns, (b) a second or plurality of image features, or (c) both. The recognition unit may thus utilize feature reference data for a second or further image feature (representative of a second type of dataform) and image data selected by use of a second or further sampling pattern, in order to derive a plurality of identification indicia. In this way, subsequent dataform decoding can be implemented in response to the indicia corresponding to the highest level of compatibility to an image feature representative of a specific type of dataform.

The FIG. 2 system further includes a decoding unit having the capability to implement any one of a plurality of dataform decoding protocols, shown as unit 91 illustrated as including decoders for three decoding protocols. As will be appreciated, both recognition unit 89 and decoding unit 91 may desirably be implemented in the form of software modules utilized under the control of CPU 88. Upon successful decoding of a dataform, decoded data is provided for further use or processing and may be made available for transmission via input/output unit 84 and port 92, as previously discussed. As noted above, a knowledge of the type of dataform which was originally decoded may be relevant to the use and interpretation of the data decoded. Accordingly, information identifying the original dataform may also be made available for further use.

To provide an autotranslation capability, the FIG. 2 system may additionally comprise an encoding unit, shown as recode unit 93, responsive to information decoded from the original dataform to recode such information from the original dataform into a preselected type of dataform. Information identifying the original dataform may also be encoded into the dataform of the preselected type. Thus, if packages incoming to a warehouse bear different types of dataforms, each incoming dataform can be identified and decoded, and the decoded data recoded into a standard form of preselected dataform. By placing the recoded standard dataform format on each respective package, further warehouse processing need be capable of reading and decoding only the preselected standard format. As will be described, the reader may include a dataform label printer so as to automatically enable a dataform of the preselected format to be placed upon each package or other item.

Figure 6A:
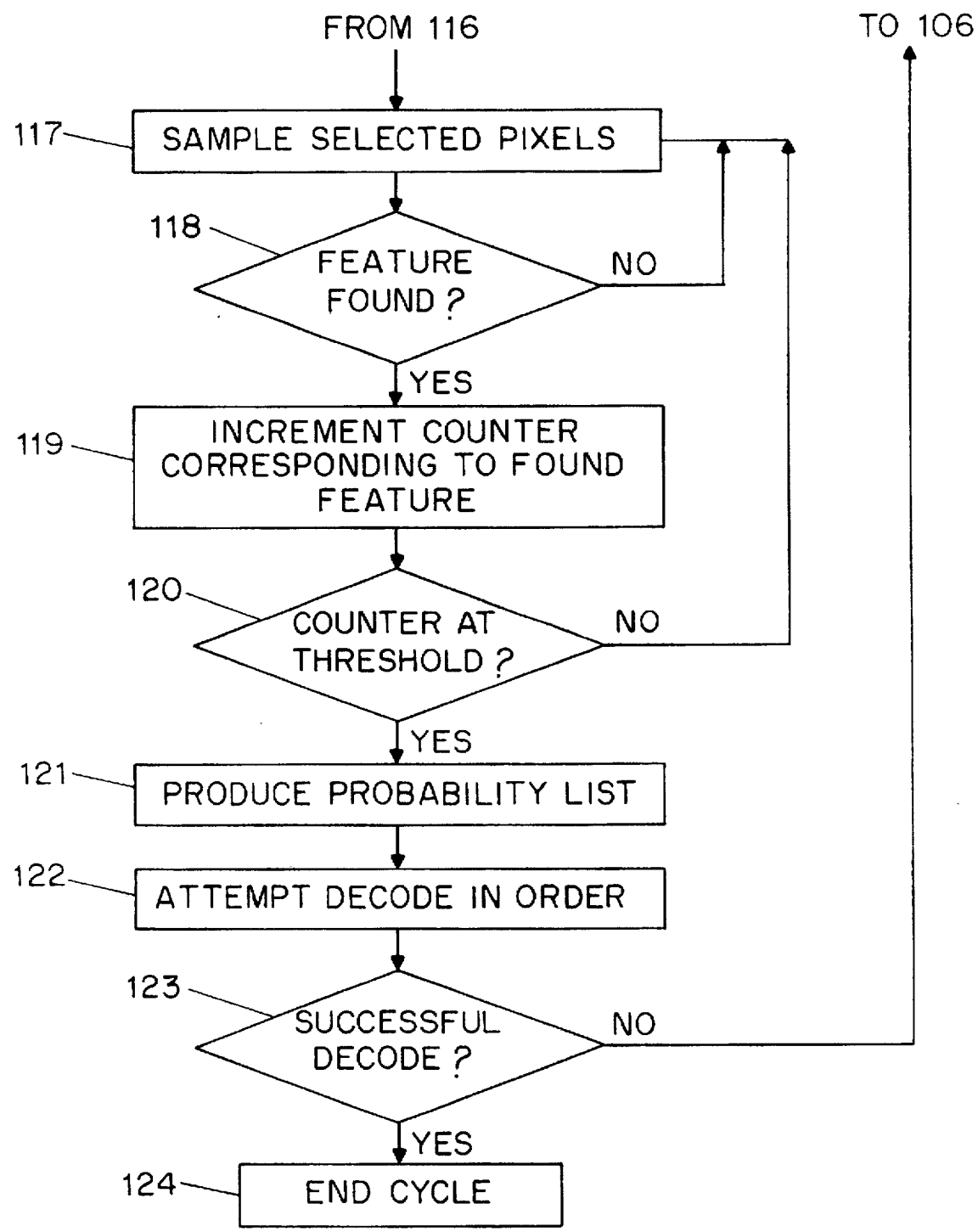
FIGS. 6A and 6B are flowcharts useful in describing operation of two forms of autodiscrimination in accordance with the invention.
Figure 7:
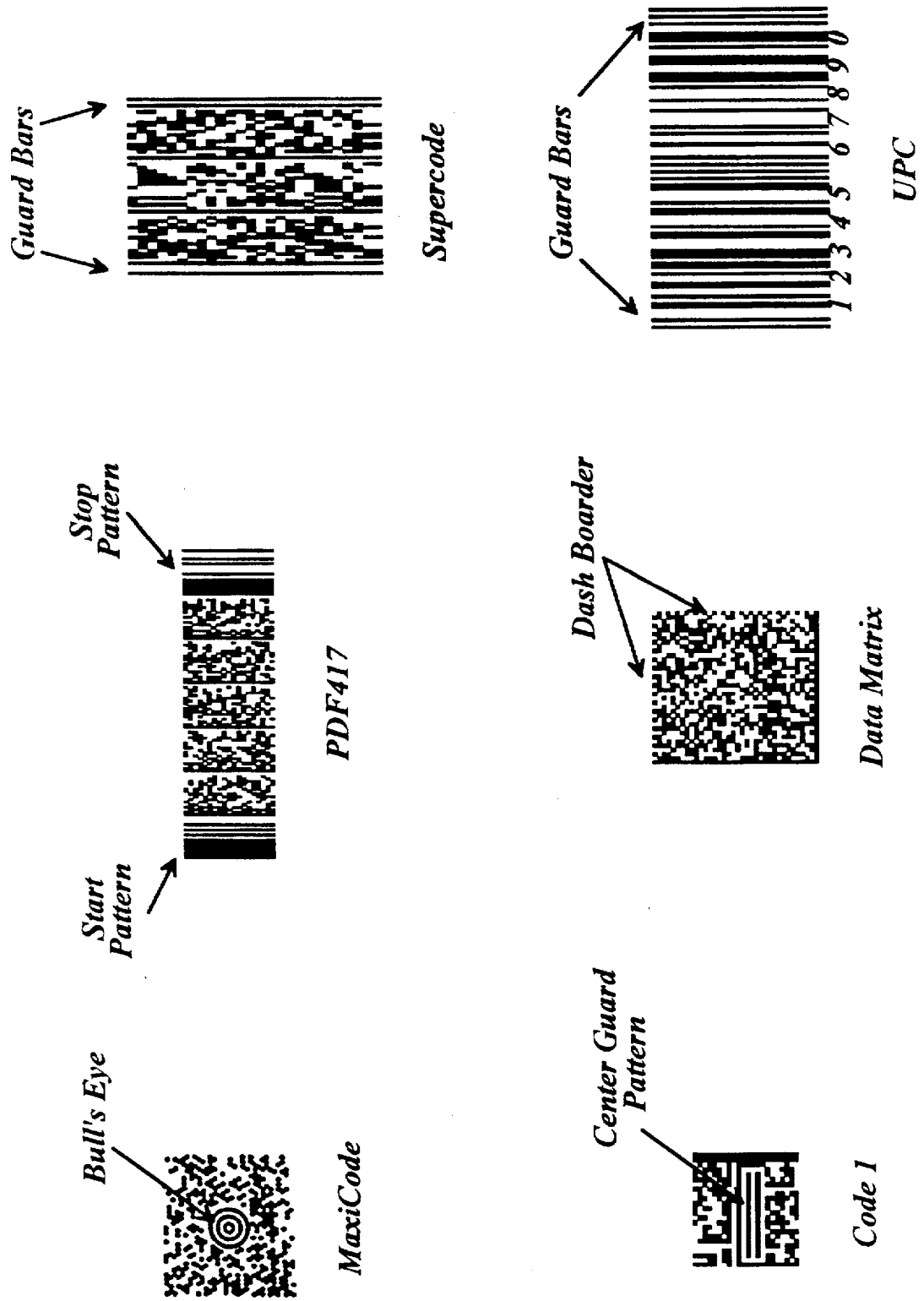
FIGS. 7, 7A and 7B show a variety of types of dataforms with indication of distinctive image features.
Figure 8A:
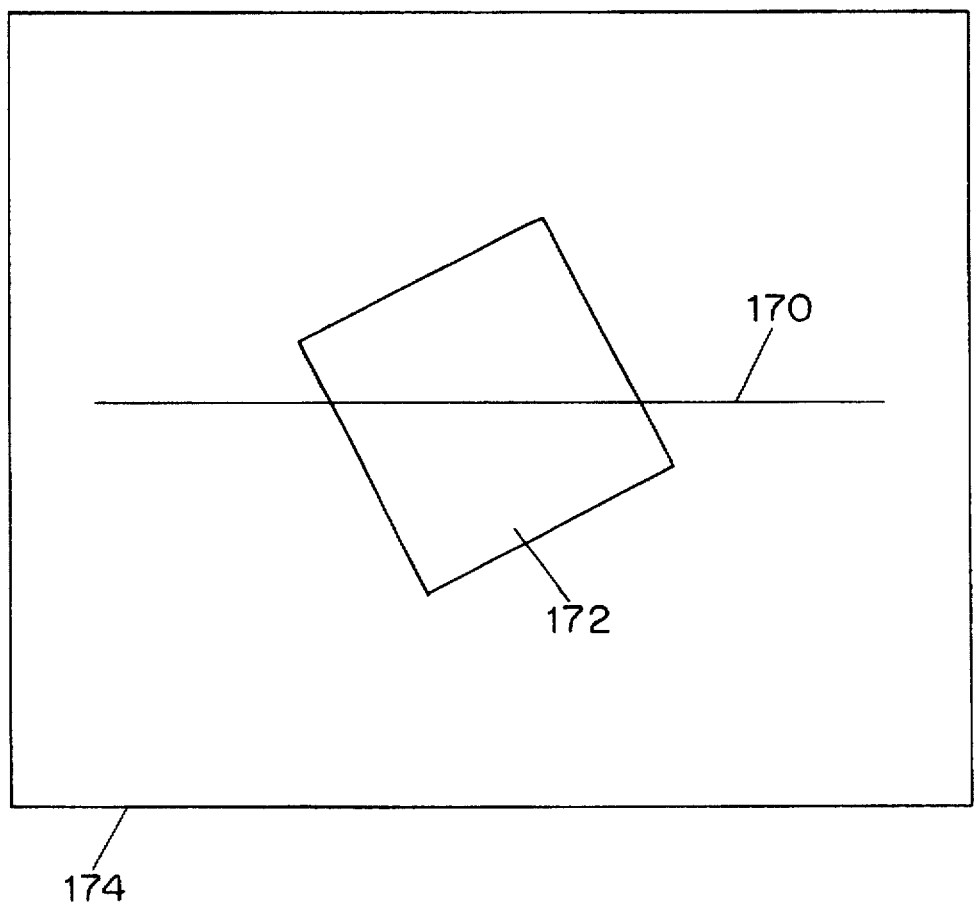
FIGS. 8A, 8B and 8C illustrate image data sampling patterns used for autodiscrimination in accordance with the invention.
Figure 8B:
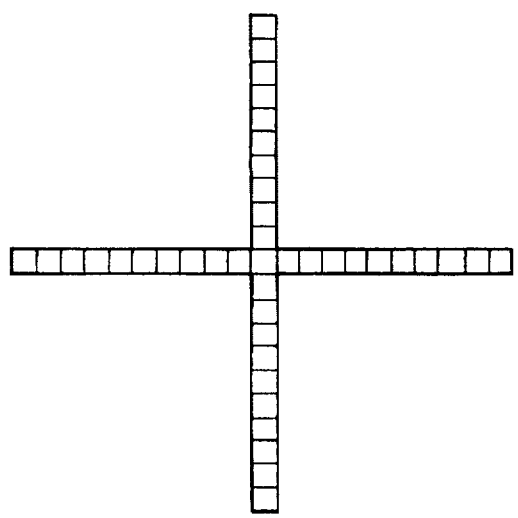
Figure 8C:
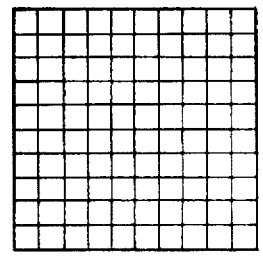

Referring now to FIG. 6A, a continuation of the FIG. 6 flowchart illustrating an autodiscrimination method in accordance with the invention is illustrated. At step 117, shown in FIG. 6A, the processor unit 88 begins an autodiscrimination and decode session by using a sampling pattern to sample selected pixels of image data from the image area to determine whether the pixels show a distinctive image feature of one of the dataforms that the reader is able to decode. FIG. 7 illustrates several types of dataforms, with distinctive image features indicated. FIGS. 8A, 8B and 8C show illustrative pixel sampling patterns that may be utilized to find unique image features of various dataform formats. FIG. 8A illustrates sampling a linear row of pixels 170 which crosses a dataform 172 (shown in outline) which is not identified in advance and which has an orientation within target area 174 which is not known in advance. Guard bars of PDF417, SuperCode or any of the 1D bar codes that are intersected by the sampled line 170 will create black/white transitions on the sample line that are proportional to the guard bar specification. Should this be the case, at step 118, a distinctive feature of the appropriate dataform has been found and at step 119, a confidence counter corresponding to the dataform with the found feature is incremented. The confidence count may be implemented in CPU 88 for each type of dataform. If no recognizable image feature is found at step 118, the processor unit proceeds back to step 117 for a new sampling of a pattern of pixels. The new sampling may utilize a different sampling pattern or may repeat linear row 170 at a different vertical position, for example.

Figure 7A:
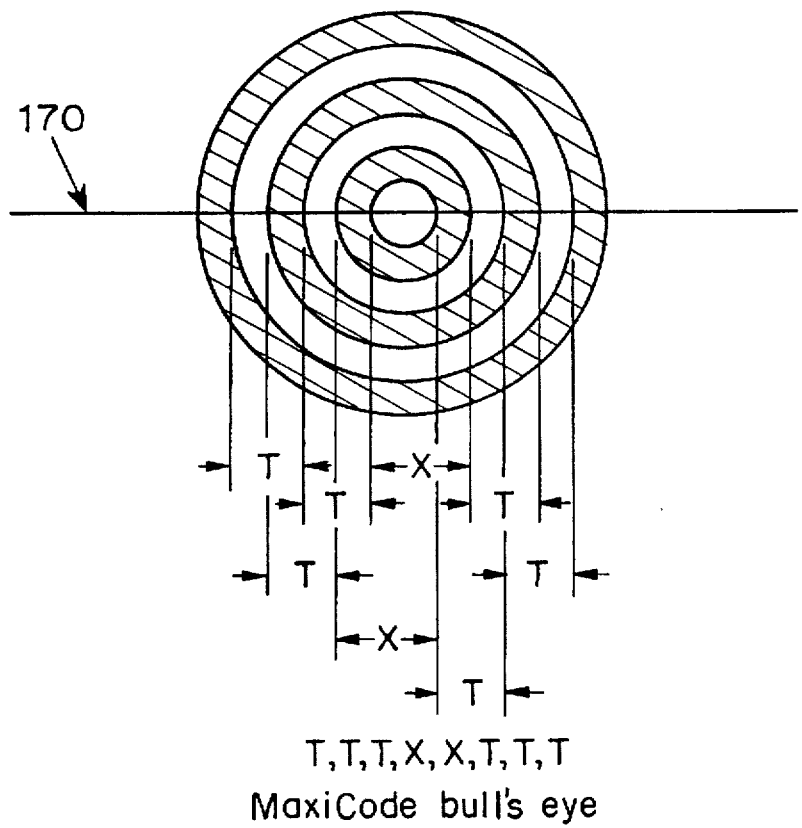
Figure 7B:
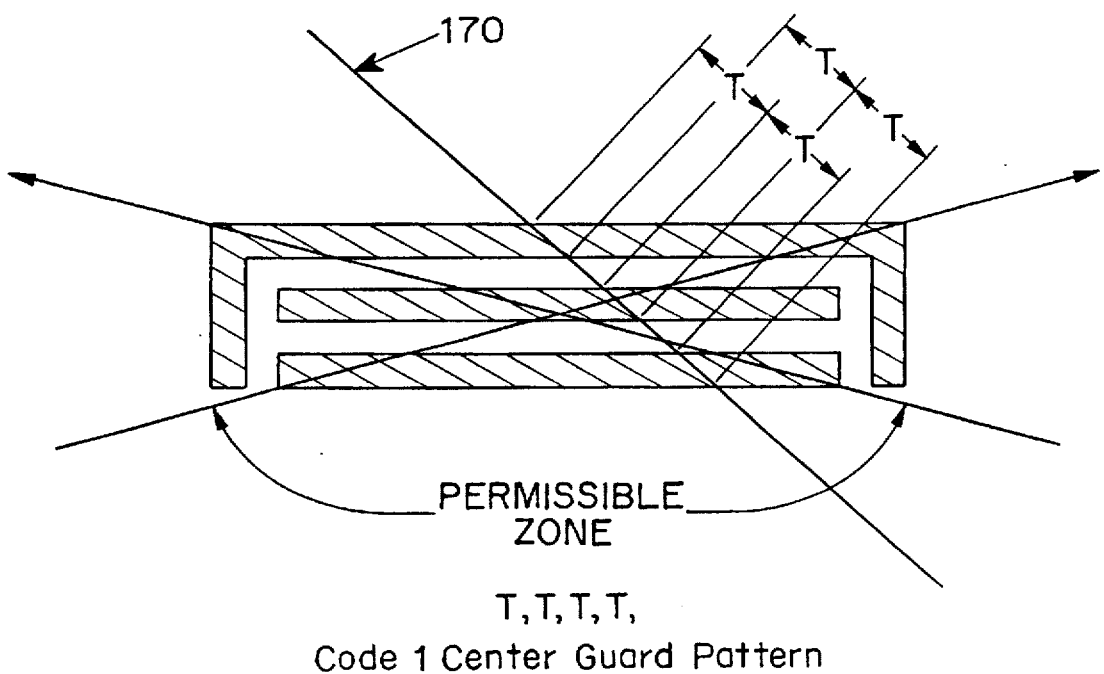

The linear row of pixels represented by line 170 in FIG. 8A is geometrically shaped to intersect and identify parallel guard bars randomly located in a large portion of the image area. If the linear row of pixels were to pass directly through the center of the bulls eye of a MaxiCode dataform a symmetrical T sequence, represented as T, T, T, X, X, T, T, T, would result as illustrated in FIG. 7A. Using this symmetrical sequence, the presence of a MaxiCode can be verified by sampling a second line at an angular separation (for example, 90 degrees as shown in FIG. 8B) through the tentatively identified MaxiCode bulls eye. If a MaxiCode has actually been located the second sampling line will provide the same symmetrical T sequence. Thus, a cross pattern of pixels as illustrated in FIG. 8B provides a sampling pattern for a pixel grouping that, if it intersects the MaxiCode bulls eye, will show both horizontal and vertical symmetry that indicates a MaxiCode bulls eye with a high degree of confidence. Similarly, the Code 1 center guard pattern can be detected by using line 170 type sampling within the permissible zone of sampling angles as shown in FIG. 7B. The resulting T sequence would be T, T, T, T within the permissible zone, as illustrated in FIG. 7B. Using this T sequence, the presence of a Code 1 dataform can be verified by sampling along a second line within the permissible zone through the tentatively identified Code 1 center guard pattern at an angular separation relative to the first sampling line. The block type sampling pattern shown in FIG. 8C is useful for detecting the smaller block pattern of an Data Matrix code or Code 1 type of dataform.

A useful technique is to employ a default method in locating a Matrix Code. After sampling many rows of pixels such as represented by line 170 in FIG. 8A the result may be that no 1D bar code, PDF code, SuperCode, Code 1 or MaxiCode has been located, but that it is determined that a sharp contrast pattern exists. The system can be arranged to then assume that a Data Matrix code is present and use a pattern such as shown in FIG. 8C to confirm that assumption. Other sampling patterns may also be provided. Each time the processor returns to step 117 to sample selected pixels, the sampling may utilize a sampling pattern positioned anywhere in the image area. The choice of a sampling pattern and position may be made from a predetermined list, a static list, or the choice may be dynamically based on confidence counter results already obtained. The term "image feature" is used to refer to a calculated relationship based on a marking pattern or guard pattern included in an image (e.g., a T sequence or other relative size relationship) as well as other recognizable features as discussed or as further defined.

At step 120, the processor checks the totals in each confidence counter. If it is determined that at least one counter has reached a threshold of confidence indicating with a high degree of probability that the previously unidentified dataform in the target area is of a format corresponding to the dataform represented by the confidence counter, the system proceeds to step 121 where it assembles a probability list for each of the possible decoders 91 (corresponding to each of the possible types of dataforms decodable). At step 122 the decoders are activated in the order of the highest probability to the lowest until a successful decode is obtained. The threshold that will trip the processor to proceed from feature finding to attempting to decode may be static, that is a predetermined confidence count of each counter at the time. Also the location of different features can result in different levels of compatibility to sampling patterns, based on the location of intersect, and thereby increment the confidence counters by different quantities. For example, a linear pixel grouping determined to identify both a start and stop pattern for a PDF417 bar code indicates with a very high degree of confidence that a PDF417 label has been found. Therefore the processor may increment the PDF417 confidence counter beyond the threshold the very first time. An intersection of the Code 1 center guard pattern is a weaker indication and may be arranged to result in a smaller incrementing of the relevant confidence counter.

At step 123, if the dataform has been successfully decoded, the processor proceeds to step 124 to end the reading cycle. If all decode attempts fail, at step 123, the system returns to step 106 to capture another image of the target area.

A method employing dataform identification before decoding of a dataform present in a target area pursuant to the invention may thus include the steps of:

(a) making available feature reference data defining at least a first image feature of at least a first type of dataform, by storing such reference data in memory 82;

(b) making available pattern reference data defining at least a first sampling pattern for selecting a limited amount of image data for a predetermined pattern of pixel positions, by storing such reference data in memory 82;

(c) providing image data, for a two-dimensional array of pixel positions, representative of illumination reflected from the target area;

(d) using step (b) pattern reference data for the first sampling pattern to select image data from pixel positions corresponding to such first sampling pattern from image data provided in step (c);

(e) utilizing step (a) feature reference data for the first image feature to develop an identification indicia representative of a level of compatibility between the image data selected in step (d) and such image feature;

(f) activating, in response to the identification indicia, a decoding protocol suitable for processing step (c) image data to decode the first type of dataform, in order to attempt to decode the dataform present in the target area;

(g) after successful decoding, recoding into a preselected dataform format information made available from the step (f) decoding; and (h) outputting a dataform in the preselected format. Such method may additionally include the following step between steps (e) and (f):

(x) repeating at least one of step (d) using pattern reference data for a second sampling pattern and step (e) utilizing feature reference data for a second image feature, to provide a plurality of identification indicia.

With inclusion of step (x), step (f) is made responsive to the identification indicia corresponding to the highest level of compatibility to an image feature representative of a type of dataform.

Figure 6B:
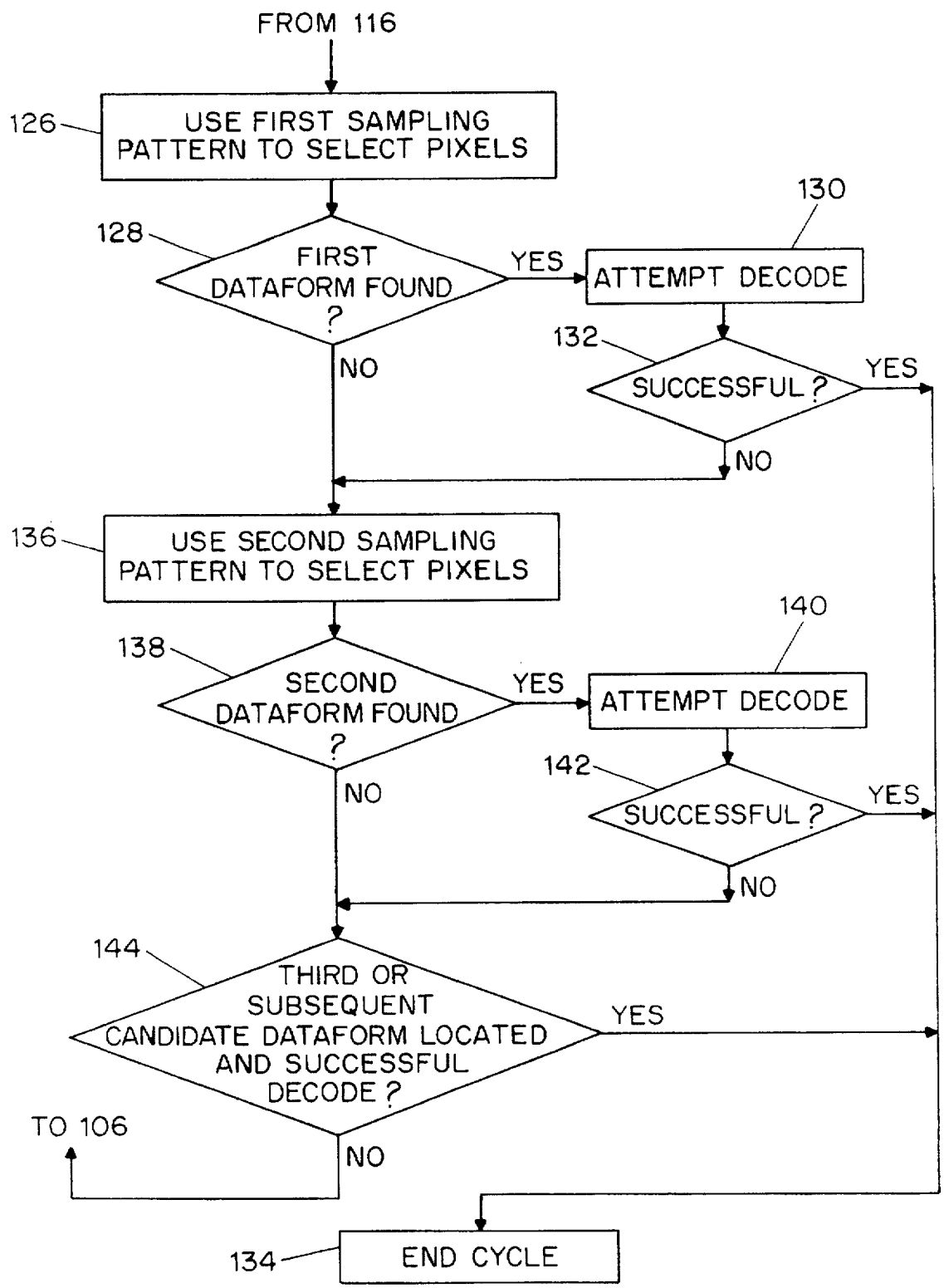

FIG. 6B is a flowchart that shows an alternative implementation of the autodiscrimination method following step 116 of FIG. 6. At step 126 the processor uses a first sampling pattern to sample a pixel grouping shaped to identify the presence of the distinctive image feature of a first candidate dataform. If found at step 128, the processor immediately progresses to step 130 where it attempts to decode with the decoder protocol corresponding to the candidate dataform format. If successful at step 132, the processor progresses immediately to step 134 where it ends the reading cycle.

Alternatively at step 128, if the distinctive feature is not found, the processor progresses to step 136 where it uses a second sampling pattern to sample pixels to identify an image feature of a second candidate dataform. If the image feature is found at step 138, the process attempts a decode with the corresponding decoder protocol at step 140 and if successful at step 142, progresses to end cycle at step 134. If the image feature was not located at step 138 or the decode was unsuccessful the processor progresses to step 144.

Step 144 represents sampling pixels using further sampling patterns to find a distinctive image feature and attempting to decode third and subsequent candidate dataforms. If one is successful, the processor proceeds to step 134 to end cycle, if not, the system proceeds back to step 106 to capture another image of the target area.

The order in which the candidate dataforms are searched for may be either static or dynamic. The static system is a fixed order. For example, the first candidate dataform is always the PDF417 2D bar code. In the dynamic system, the order of the candidate dataforms may be altered based on the previous dataform read or the most common expected dataform in a particular application. For example, if the previous dataform read was a Data Matrix, the Data Matrix code may be the first candidate dataform for the current read session. Note that a pixel grouping may be geometrically shaped to identify an image feature common to more than one candidate dataform. For example, a linear array of pixels is ideally shaped to find the guard bars of PDF417, SuperCode and 1D bar codes. If this is the case, microprocessor may consider each of these possibilities to be sub-candidate dataforms which in aggregate define a candidate dataform for steps 126, 136 or 144. In that case, if guard bars are found, the processor then determines which of the sub-candidate formats corresponds to the found guard bars.

In either of the embodiments of FIGS. 6A and 6B, if decoding is successful, the decoded dataform information is made available for transmission out of the dataform reader 10 via I/O unit 84 and an end-cycle step terminates the reading cycle by turning off at least one of input power and clock signals as utilized by the array control unit 28.

Figure 9:
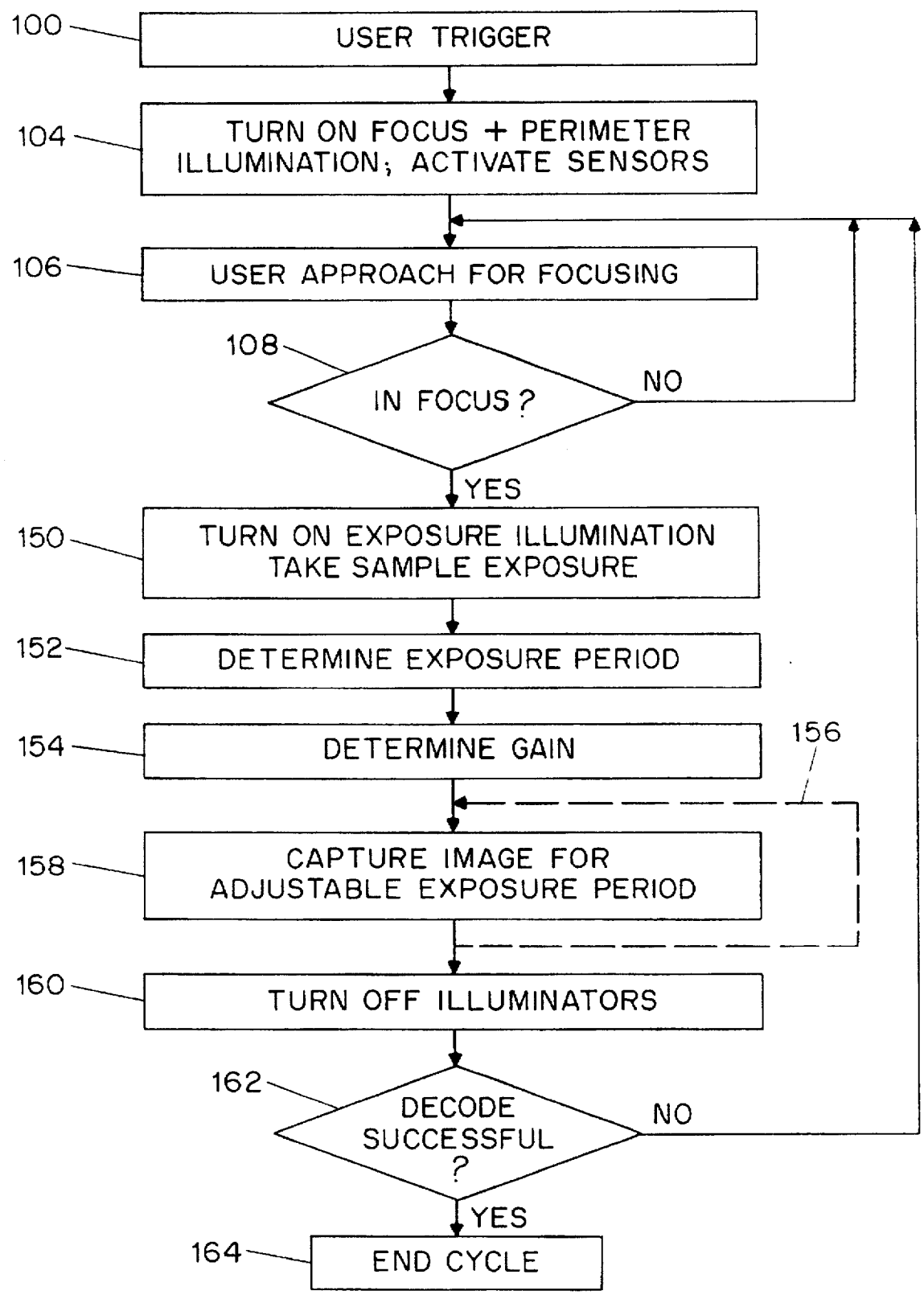
FIG. 9 is a flowchart useful in describing operation of the second general embodiment of the invention.

FIG. 9 is a flowchart corresponding to a second general embodiment of this invention. Steps 100 to 108 operate the same as described in the FIG. 6 embodiment. After determining the in-focus condition at 108 and generating an in-focus signal, the exposure illuminators are turned on for a preset sample exposure period and image data is collected at step 150. To do this, the exposure control device generates a sample exposure start signal whereby selected photo sensors are grounded to a reference charge and begin accumulating a sample charge. At the end of the preset exposure period, the exposure control device, a portion of which could simply be a timer for this purpose, generates a stop signal whereby the sample accumulated charge on each selected sensor is read as image data. At step 152, in response to image data collected during the sample exposure, the exposure control device determines the appropriate duration of an adjustable exposure period. As discussed, the appropriate duration of the exposure period may be determined by accumulating, via exposure unit 64a of FIG. 5, image data from the selected sensors and referring a resulting voltage level to a look up table stored in memory 82a.

It will be appreciated that the level of reflected illumination will be determined by, among other possible factors, the reflectance of the target area. Such reflectance may be substantially higher or lower than an expected or typical value in certain conditions of surface texture or coloration. Accordingly, it may be desirable to control the gain of image signals from the array, as well as the exposure period. This result can be provided by accumulating, via gain unit 60a of FIG. 5, image data from selected sensor elements and referring a signal representative thereof to a look-up table in memory 82awhich, for particular levels of illumination reflected during the preset initial period, provides values for adjustment of image signal output gain. With an understanding of the invention, skilled persons will be enabled to provide appropriate look-up tables utilizing empirical or other techniques. FIG. 9 thus provides step 154 for using the sample image data to determine an appropriate gain adjustment to apply to the output amplifier of the sensor array assembly.

At step 158 the device captures a single frame of image data. As discussed above, if the sensor array is structured so that all photosensor cells are referenced, exposed, and sampled in parallel to generate a full frame of data, then step 158 will consist of only one cycle of grounding, exposing and sampling the accumulated charge on the cells. At step 160 the exposure illuminator is turned off. As further discussed, if the photosensor array is structured so that only selected sensor elements may be read in parallel in a single cycle, the exposure control device will generate a plurality of start and stop signals corresponding to the predetermined exposure time as indicated by dashed path 156, as appropriate to complete the reading of all cells. After collecting a full frame of data, at step 160 the exposure illuminators are turned off.

Step 162 represents either the accumulated recognition and decode steps 117 to 123 of the FIG. 6A embodiment or the accumulated recognition and decode steps 126 to 134 of the FIG. 6B embodiment. Again, if the dataform is successfully decoded, data transmission and termination of the reading cycle, including termination of at least one of the input power and clock signals utilized by the array control device, proceed to step 164.

Either of the two general embodiments of FIGS. 6 and 9 terminates with transmission of data by coupling data to output port 92. The data may include both the decoded data and data indicative of the original dataform format to be recoded in a dataform of a preselected or standardized format referred to as a translate dataform. In an autotranslation embodiment of this invention, output port 92 couples to an encoder and printer assembly as generally shown in FIG. 10. The encoder may be embodied in a computer unit such as 300 coupled to the reader 10 pictured reading bar code 308 in a target area on package 310. The computer unit may have a built-in printer producing the translated dataform on label 302. Alternatively, an external printer 304 may be used to print the translated dataform on label 306.

Figure 11:
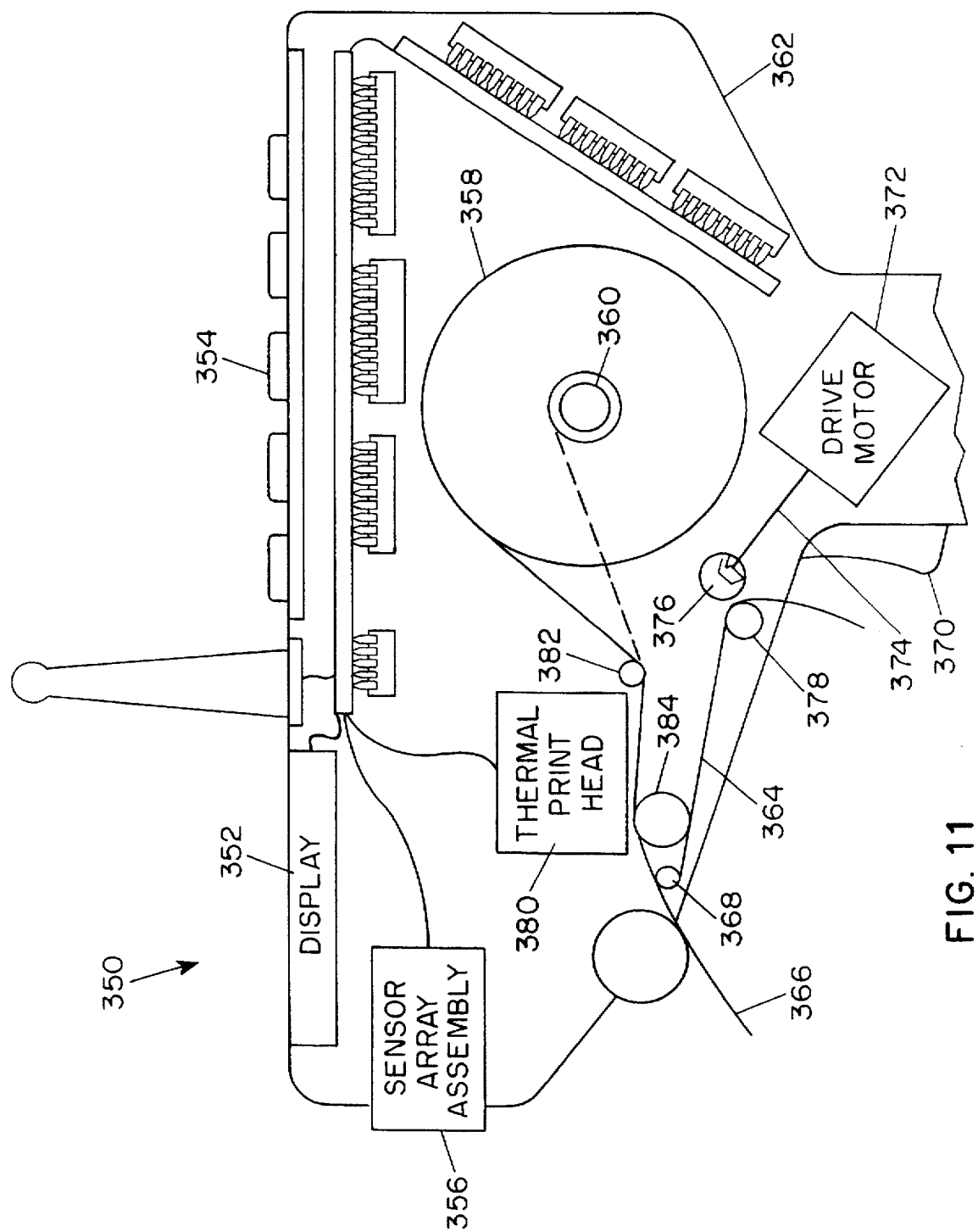
FIG. 11 shows a form of hand-held reader providing both autodiscrimination and autotranslation to print out standardized recoded dataform labels in accordance with the invention.

FIG. 11 shows generally components of a hand-held unit capable of operating the autotranslation embodiment of this invention. The reader 350 includes a display 352, keyboard 354 and sensor array assembly 356. In addition to the various elements of the reader 10 of FIG. 1, this reader has a built-in printer. A label supply roll 358 is supported on an axle 360. The axle 360 is supported between opposite walls of the housing 362. The roll 358 is comprised of a composite web 364 and a plurality of space apart labels adhering to the web (only the modified bar code label 366 is shown peeled from the web). A full roll is shown in solid while a depleted roll is shown in phantom line. The labels are releasably secured to the web 364 by a pressure sensitive adhesive. A layer of silicone is coated on the upper surface of the web 364 facing of the labels so that the labels are sheared or peeled from the web as the web curves around a small diameter peel roller 368.

The translated dataform label 366 is illustrated in a peeled position with respect to the web 364. In response to actuation of the trigger switch 370, an electric drive motor 372 drives a shaft 374 having a bevel gear affixed to one end of the shaft. The bevel gear co-acts with a drive gear (not shown) coupled to a drive roller 376 to rotate a drive roller. The drive roller 376 cooperates with an idler roller 378 to advance the web 364 past the thermal printhead 380. The printhead prints the translated dataform on the leading label as the label passes under the printhead. A guide roller 382 and a platen 384 properly position the web under the printhead during printing. By use of the FIG. 11 configuration both autodiscrimination and autotranslation are provided in a hand-held unit. A variety of types of dataforms on incoming packages are first identified and then decoded. The unit then automatically prints out a translated dataform of a preselected standardized format for placement on the package whose dataform was just read. Subsequent warehouse or other operations are thus simplified since all packages or other items bear a standard type of dataform.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method employing 2D dataform identification before decoding of a dataform present in a target area, comprising the steps of:
    (a) making available feature reference data defining at least a first image feature of at least a first type of 2D dataform;
    (b) making available pattern reference data defining at least a first sampling pattern for selecting a limited amount of image data for a predetermined pattern of pixel positions representing less than a complete dataform image;

(c) providing image data, for a two-dimensional array of pixel positions, representative of illumination reflected from said target area;

(d) using step (b) pattern reference data for said first sampling pattern to select image data from pixel positions corresponding to said first sampling pattern from image data provided in step (c);

(e) utilizing step (a) feature reference data for said first image feature to develop an identification indicia representative of a level of compatibility between said sampling pattern image data selected in step (d) and said image feature; and (f) activating, in response to said identification indicia, a decoding protocol suitable for processing step (c) image data to decode said first type of 2D dataform, in order to attempt to decode said dataform present in said target area.

2. A method as in claim 1, additionally including the following steps for use in the event step (f) does not successfully decode said dataform:

(g) repeating step (d) using pattern reference data for a second sampling pattern; and (h) repeating steps (e) and (f).

3. A method as in claim 1, additionally including the following steps for use in the event step (f) does not successfully decode said dataform:

(g) repeating step (e) utilizing feature reference data for a second image feature; and (h) repeating step (f).

4. A method as in claim 1, additionally including the following steps for use in the event step (f) does not successfully decode said dataform:

(g) repeating step (d) using pattern reference data for a second sampling pattern;

(h) repeating step (e) utilizing feature reference data for a second image feature; and (i) repeating step (f).

5. A method as in claim 1, additionally including the following step between steps (e) and (f):

(x) repeating at least one of step (d) using pattern reference data for a second sampling pattern and step (e) utilizing feature reference data for a second image feature, to provide a plurality of identification indicia;

and wherein step (f) is responsive to the identification indicia corresponding to the highest level of compatibility to an image feature representative of a type of dataform.

6. A method employing 2D dataform identification before decoding of a dataform present in a target area, comprising the steps of:

(a) making available feature reference data defining at least a first image feature of at least a first type of 2D dataform;

(b) making available pattern reference data defining at least a first sampling pattern for selecting a limited amount of image data for a predetermined pattern of pixel positions representing less than a complete dataform image;

(c) providing image data, for a two-dimensional array of pixel positions, representative of illumination reflected from said target area;

(d) using step (b) pattern reference data for said first sampling pattern to select image data from pixel positions corresponding to said first sampling pattern from image data provided in step (c);

(e) utilizing step (a) feature reference data for said first image feature to develop an identification indicia representative of a level of compatibility between said sampling pattern image data selected in step (d) and said image feature;

(f) activating, in response to said identification indicia, a decoding protocol suitable for processing step (c) image data to decode said first type of 2D dataform, in order to attempt to decode said dataform present in said target area;

(g) after successful decoding in step (f), recoding, into a preselected 2D dataform format different from said first type of 2D dataform, information made available from the step (f) decoding; and (h) outputting a dataform in said preselected format.

7. A method as in claim 6, wherein step (g) includes also encoding into said preselected dataform format information identifying the type of dataform present in said target area.

8. A method as in claim 6, additionally including the following steps for use in the event step (f) does not successfully decode said dataform:

(i) repeating step (d) using pattern reference data for a second sampling pattern;

(j) repeating steps (e)–(h).

9. A method as in claim 6, additionally including the following steps for use in the event step (f) does not successfully decode said dataform:

(i) repeating step (e) utilizing feature reference data for a second image feature;

(j) repeating steps (f)–(h).

10. A method as in claim 6, additionally including the following steps for use in the event step (f) does not successfully decode said dataform:

(h) repeating step (d) using pattern reference data for a second sampling pattern;

(i) repeating step (e) utilizing feature reference data for a second image feature;

(j) repeating steps (f)–(h).

11. A method as in claim 6, additionally including the following step between steps (e) and (f):

(x) repeating at least one of step (d) using pattern reference data for a second sampling pattern and step (e) utilizing feature reference data for a second image feature, to provide a plurality of identification indicia;

and wherein step (f) is responsive to the identification indicia corresponding to the highest level of compatibility to an image feature representative of a type of dataform.

12. A system employing 2D dataform identification before decoding of a dataform present in a target area, comprising:

a memory device to store (a) feature reference data for at least a first image feature representative of at least one type of 2D dataform and (b) pattern reference data for at least a first sampling pattern for selecting a limited amount of image data for a predetermined pattern of pixel positions;

a sensor array to provide image data for a two-dimensional array of pixel positions, said image data representative of illumination reflected from said target area;

a processor coupled to said memory device to use pattern reference data for said first sampling pattern in order to select, from image data provided by said sensor array, image data for pixel positions corresponding to said first sampling pattern; and a recognition unit coupled to said processor to utilize feature reference data for said first image feature to develop an identification indicia representative of a level of compatibility between said selected image data and said image feature, said identification indicia useful in identifying the type of dataform present in said target area.

13. A system as in claim 12, additionally comprising:

a decoding unit having the capability to implement a plurality of dataform decoding protocols and responsive to said identification indicia for selection of one of said protocols for attempted decoding of said dataform present in said target area.

14. A system as in claim 13, wherein said memory device is additionally arranged to store image data provided by said sensor array and make said stored image data available for further processing and decoding.

15. A system as in claim 12, wherein said processor is adapted to use pattern reference data for a second sampling pattern to select image data for pixel positions corresponding to said second sampling pattern.

16. A system as in claim 15, additionally comprising:

a decoding unit having the capability to implement a plurality of 2D dataform decoding protocols and responsive to said identification indicia for selection of one of said protocols for attempted decoding of said dataform present in said target area.

17. A system as in claim 12, wherein said recognition unit is arranged to utilize feature reference data for a second image feature, representative of a second type of dataform, to develop an identification indicia representative of a level of compatibility between said selected image data and said second image feature.

18. A system as in claim 17, additionally comprising:

a decoding unit having the capability to implement a plurality of dataform decoding protocols and responsive to said identification indicia for selection of one of said protocols for attempted decoding of said dataform present in said target area.

19. A system as in claim 12, wherein said processor is adapted to use pattern reference data for a second sampling pattern to select image data for pixel positions corresponding to said second sampling pattern, and said recognition unit is arranged to utilize feature reference data for a second image feature, representative of a second type of dataform, to develop an identification indicia representative of a level of compatibility between said selected image data and said second image feature.

20. A system as in claim 12, wherein said processor uses stored pattern data for a plurality of sampling patterns and said recognition unit utilizes stored feature data for a plurality of image features in order to develop a plurality of identification indicia representative of levels of compatibility between selected image data and image features representative of a plurality of types of dataforms.

21. A system as in claim 20, additionally comprising:

a decoding unit having the capability to implement a plurality of dataform decoding protocols and responsive to said identification indicia for selection of the protocol corresponding to a relatively high level of compatibility to an image feature representative of a type of dataform.

22. A system employing 2D dataform identification before decoding of a dataform present in a target area, comprising:

a memory device to store (a) feature reference data for at least a first image feature representative of at least one type of 2D dataform and (b) pattern reference data for at least a first sampling pattern for selecting a limited amount of image data for a predetermined pattern of pixel positions;

a sensor array to provide image data for a two-dimensional array of pixel positions, said image data representative of illumination reflected from said target area;

a processor coupled to said memory device to use pattern reference data for said first sampling pattern in order to select, from image data provided by said sensor array, image data for pixel positions corresponding to said first sampling pattern;

a recognition unit coupled to said processor to utilize feature reference data for said first image feature to develop an identification indicia representative of a level of compatibility between said selected image data and said image feature, said identification indicia useful in identifying the type of dataform present in said target area;

a decoding unit having the capability to implement a plurality of dataform decoding protocols and responsive to said identification indicia for selection of one of said protocols for attempted decoding of said dataform present in said target area; and an encoding unit coupled to said decoding unit and responsive to information decoded from said dataform to recode one of the following into a preselected type of dataform different from said dataform: (a) said information decoded from said dataform and (b) said information decoded from said dataform together with information identifying the type of dataform present in said target area.

23. A system as in claim 22, wherein said memory device is additionally arranged to store image data provided by said sensor array and make said stored image data available for further processing and decoding.

24. A system as in claim 22, wherein said processor is adapted to use pattern reference data for a second sampling pattern to select image data for pixel positions corresponding to said second sampling pattern.

25. A system as in claim 22, wherein said recognition unit is arranged to utilize feature reference data for a second image feature, representative of a second type of dataform, to develop an identification indicia representative of a level of compatibility between said selected image data and said second image feature.

26. A system as in claim 22, wherein said processor is adapted to use pattern reference data for a second sampling pattern to select image data for pixel positions corresponding to said second sampling pattern, and said recognition unit is arranged to utilize feature reference data for a second image feature, representative of a second type of dataform, to develop an identification indicia representative of a level of compatibility between said selected image data and said second image feature.

27. A system as in claim 22, wherein said processor uses stored pattern data for a plurality of sampling patterns and said recognition unit utilizes stored feature data for a plurality of image features in order to develop a plurality of identification indicia representative of levels of compatibility between selected image data and image features representative of a plurality of types of dataforms.

28. A hand-holdable system for reading and recoding dataforms, comprising:

an enclosure adapted to be held in one hand and including the following combination:
- (a) a sensor device to provide image data representative of illumination reflected from a target area including a first 2D dataform of a first type;
- (b) a decoding unit coupled to said sensor device to decode said first 2D dataform and provide identification of said first type of dataform;
- (c) an encoding unit coupled to said decoding unit and responsive to information decoded from said first 2D dataform to recode said information into a second 2D dataform of a second type and encode said identification into said second 2D dataform; and
- (d) a printer unit coupled to said encoding unit to print out a label bearing a representation of said second 2D dataform.

29. A hand-holdable reading and recoding system comprising:

an enclosure adapted to be held in one hand and including the following combination:
- (a) a sensor device to provide image data representative of illumination reflected from a target area including a first 2D dataform of a first type;
- (b) a decoding unit coupled to said sensor device to decode said first 2D dataform;
- (c) an encoding unit coupled to said decoding unit and responsive to information decoded from said first 2D dataform to recode said information into a second 2D dataform of a second type; and
- (d) a printer unit coupled to said encoding unit to print out a label bearing a representation of said second 2D dataform;

said system, additionally comprising:
- a processor coupled to said sensor device and arranged to select a limited amount of said image data corresponding to an image data sampling pattern;
- a recognition unit coupled to said processor to utilize said image data selected by said processor for purposes of identification of said first type of dataform and provision of identification indicia to said decoding unit to enable said decoding unit to implement an appropriate dataform decoding protocol; and
- a memory device to store pattern reference data representative of said image data sampling pattern, for use by said processor, and to store feature reference data representative of an image feature of said first type of dataform, for use by said recognition unit in analyzing said image data corresponding to said sampling pattern.

30. A hand-holdable system for autodiscriminating and decoding dataforms, comprising:

an enclosure adapted to be held in one hand and including the following combination:
- (a) a sensor device to provide image data representative of illumination reflected from a target area including a first 2D dataform;
- (b) a recognition unit coupled to said sensor device and responsive to a sampled pattern of said image data, representing less than a complete dataform image, to identify said first 2D dataform as to type of dataform by recognition of an image feature distinctive for said type of dataform;
- (c) a processor coupled to said sensor device and arranged to select a limited amount of said image data corresponding to said sampled pattern for coupling to said recognition unit;
- (d) a decoding unit coupled to said recognition unit to decode said first 2D dataform by use of a dataform decoding protocol effective to decode said type of dataform; and
- (e) a memory device to store pattern reference data representative of said sampled pattern and feature reference data representative of said image feature.

* * * * *